(12) United States Patent
Pickert et al.

(10) Patent No.: US 7,438,523 B2
(45) Date of Patent: Oct. 21, 2008

(54) BLADE FOR A TURBINE ENGINE AND METHOD FOR PRODUCTION OF SAID BLADE

(75) Inventors: Ursula Pickert, Muelheim a.d. Ruhr (DE); Peter Tiemann, incapacitated, Witten (DE); by Iris Oltmanns, legal representative, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 612 days.

(21) Appl. No.: 10/486,607

(22) PCT Filed: Jul. 24, 2002

(86) PCT No.: PCT/EP02/08251

§ 371 (c)(1),
(2), (4) Date: Oct. 8, 2004

(87) PCT Pub. No.: WO03/014528

PCT Pub. Date: Feb. 20, 2003

(65) Prior Publication Data

US 2005/0076503 A1    Apr. 14, 2005

(30) Foreign Application Priority Data

Aug. 9, 2001    (EP)    .................... 01119248

(51) Int. Cl.
*F01D 9/02*    (2006.01)
*F01D 5/18*    (2006.01)

(52) U.S. Cl. ................ 415/200; 415/208.1; 415/211.2; 416/232; 416/241 R; 29/463; 29/889.72; 29/889.721; 228/165; 228/171; 228/193

(58) Field of Classification Search ................ 415/200, 415/191, 208.1, 208.2, 211.2; 416/232–233, 416/241 R; 29/428, 463, 889.72, 889.721, 29/889.722; 228/171, 193, 165
See application file for complete search history.

(56) References Cited

U.S. PATENT DOCUMENTS

| | | | |
|---|---|---|---|
| 1,748,364 A * | 2/1930 | Ray ........................ 29/889.72 |
| 1,829,179 A * | 10/1931 | Back .......................... 416/232 |
| 3,083,446 A | 4/1963 | Stalker |
| 3,628,226 A | 12/1971 | Nelson |
| 3,736,638 A | 6/1973 | Stone, Jr. |
| 4,507,051 A | 3/1985 | Lesgourgues et al. |
| 4,815,939 A | 3/1989 | Doble |
| 5,063,662 A | 11/1991 | Porter et al. |
| 5,269,058 A | 12/1993 | Wiggs et al. |
| 5,429,877 A * | 7/1995 | Eylon ........................ 416/232 |
| 5,448,829 A | 9/1995 | Dillner et al. |
| 5,516,593 A | 5/1996 | Weisse et al. |
| 6,257,828 B1 * | 7/2001 | Bischoff-Beiermann et al. . 415/200 |

* cited by examiner

*Primary Examiner*—Christopher Verdier

(57) ABSTRACT

A blade for a turbine engine is described, having a base body, made from a titanium alloy, with a first and a second component piece, which are connected in the connection region by means of a bonding process. A groove with a groove wall runs through the connection region, to prevent local concentration of tension, such that the above borders directly on the second component piece and forms therewith a connection angle greater than 70 degrees.

20 Claims, 4 Drawing Sheets

BLADE FOR A TURBINE ENGINE AND METHOD FOR PRODUCTION OF SAID BLADE

CROSS REFERENCE TO RELATED APPLICATIONS

This application is the US National Stage of International Application No. PCT/EP02/08251, filed Jul. 24, 2002 and claims the benefit thereof. The International Application claims the benefits of European application No. 01119248.1 EP filed Aug. 9, 2001, both of the applications are incorporated by reference herein in their entirety.

FIELD OF INVENTION

The invention relates to a blade or vane of a turbomachine having a base body made from a titanium alloy. It also relates to a process for producing a blade or vane of this type.

BACKGROUND OF INVENTION

A rotor blade of a compressor made from a titanium alloy is known from U.S. Pat. No. 5,063,662. Blades and vanes which are based on titanium offer the advantage of a considerable weight saving compared, for example, to blades or vanes made from steel. However, titanium alloys are almost impossible to cast. A forged blade or vane cannot be of hollow design, which means that the weight saving is wiped out again. One possible way of producing a blade or vane of this type is to bond together two halves. In this case, the halves are joined to one another at a high pressure and a high temperature. Then, the blade or vane is twisted. To maintain its shape, a gas is fed to the hollow interior of the blade or vane under a high pressure. The way in which a gas feed line is introduced into the blade or vane root of a titanium blade or vane forms the subject matter of U.S. Pat. No. 5,448,829.

Furthermore, U.S. Pat. No. 5,516,593 reveals a titanium turbine blade or vane produced from two halves by means of a diffusion bonding process. Opposite grooves running in the longitudinal extent of the blades or vanes are provided in the region of the leading edge and trailing edge on the contact surfaces of the two halves which are in contact with one another. During the bonding process, the cavities formed by the grooves serve as a yielding space for the excess material which would otherwise lead to buckling at the flow surface of the turbine blades or vanes.

SUMMARY OF INVENTION

The invention is based on the object of providing a blade or vane of a turbomachine in which the strength of a bonded joining region is improved. Furthermore, it is intended to provide a particularly suitable process for producing a blade or vane of this type.

In terms of the blade or vane, according to the invention the object is achieved by the features of the claims. For this purpose, the blade or vane has a leading edge and a trailing edge, a blade or vane profile made from a titanium alloy with a first shell-like component piece and a second shell-like component piece, the component pieces each being delimited by contact surfaces which are bonded to one another by means of a high-pressure and high-temperature joint, so as to form a joining region, such that a cavity, which is surrounded by the inner sides of the component pieces is formed between the component pieces, wherein a groove is arranged in the longitudinal direction of the blade or vane, at the joining region between the first inner side of the first shell-like component piece and the first contact surface, wherein the groove on one side adjoins the first contact surface of the first component piece and on the other side adjoins the first inner side of the first component piece, and wherein only the first contact surface is bonded to the second component piece, and the wall of the groove forms a joining angle of greater than 70 degrees with the contact surfaces. Furthermore, a blade or vane component piece having a first leading edge, a first trailing edge, a first inner surface, a first outer surface, a first leading edge contact face extending between the first inner and first outer surfaces towards the first leading edge, a first trailing edge contact face extending between the first inner and first outer surfaces towards the first trailing edge, a first leading edge arc defined by a first end point located along the first leading edge contact face and a second end point located along the first inner surface, and a first trailing edge arc defined by a first end point located along the first trailing edge contact face and a second endpoint located along the first inner surface; a second blade or vane component piece having a second leading edge, a second trailing edge, a second inner surface, a second outer surface, a second leading edge contact face extending between the second inner and second outer surfaces towards the second leading edge, a second trailing edge contact face extending between the second inner and second outer surfaces towards the second trailing edge, a second leading edge arc defined by a first end point located along the second leading contact face and a second end point located along the second inner surface, and a second trailing edge arc defined by a first end point located along the second trailing edge contact face and a second endpoint located along the second inner surface; a leading edge bond adapted to adhere the first leading edge contact face with the second leading edge contact face such that the first leading edge arc and the second leading edge arc form a continuous arc; and a trailing edge bond adapted to adhere the first trailing edge contact face with the second trailing edge contact face such that the first trailing edge arc and the second trailing edge arc region further form the continuous arc, wherein the leading and trailing edge bonds are formed in a joining region, wherein the continuous arc runs along the entire joining region, wherein the continuous arc has an arc depth which varies along the continuous arc direction, wherein the first component piece and the second component piece, in the joining region, form a common wall thickness which varies along the joining region, the continuous arc depth becoming deeper as the wall thickness increases. The first leading edge arc, the second leading edge arc, the first trailing edge arc, and the second trailing edge arc, each have a radius of curvature that is not constant. The continuous arc formed by the first leading edge arc and the second leading edge arc, and the continuous arc formed by the first trailing edge arc and the second trailing edge arc, each have a plurality of radii of curvature. The continuous arc formed by the first leading edge arc and the second leading edge arc, and the continuous arc formed by the first trailing edge arc and the second trailing edge arc, each have a radius of curvature that forms an ellipse.

The invention consequently provides a blade or vane in which there is no joint between the first inner side and the second component piece, i.e. the first inner side is not bonded to the second component piece. If this is not the case, i.e. if the first inner side is also bonded to the second component piece, the effect which is deliberately produced by the invention, namely a reduction in the material stresses in the joining region, is cancelled out. Therefore, a joint there would have adverse effects and the joint would not withstand the loads which occur.

The invention is based on the discovery that the joint using a bonding process can lead to strength problems in a blade or vane when acute angles are involved. Particularly when bonding a blade or vane comprising two halves which are joined to one another at the leading edge and at the trailing edge, acute angles of this nature are produced. This locally leads to very high concentrations of stresses, which can cause the joint to tear open.

The groove arranged in the joining region alters the acute angle at which the first and second component pieces would normally meet to a value of greater than 70 degrees. As a result, the local concentration of stresses in the joining region is reduced to such an extent that there is no longer any risk of the joint between the first and second component pieces tearing open.

In a further advantageous configuration, an opposite groove with an opposite-groove wall, lying opposite the groove and running in the longitudinal direction of the blade or vane, runs at the joining region between the inner side of the second component piece and the second contact surface, in such a manner that the opposite-groove wall and the groove wall adjoin one another flush at the joining region and form the joining angle. In this configuration, the joining angle can in a simple way be increased even to over 90 degrees.

The joining angle may amount to more than 120 degrees, in particular more than 150 degrees. A joining angle of approximately 180 degrees, with the groove wall and the opposite-groove wall being oriented at right angles to the surface of the first and second component pieces directly at the edges of the grooves, is particularly advantageous.

The titanium alloy preferably comprises titanium aluminide. Titanium aluminide has particularly favorable properties in terms of its ability to with-stand high temperatures. However, with titanium aluminide there is likewise a need for bonding during production of the blade or vane. The improvement in the joining strength in the bonding region produced by the groove means that titanium aluminide will now be available even for applications with high strength demands.

In an advantageous configuration, the groove runs along the entire joining region. Although it is conceivable for the groove to be formed partially in, for example, regions which are subject to particularly high mechanical loads, and also for a plurality of grooves to be provided, in manufacturing technology terms it is particularly simple to provide a single groove which extends along the entire joining region.

The groove expediently has a groove depth which varies along the groove direction. In this case, the first component piece and the second component piece, in the joining region, form a common wall thickness which varies along the joining region, with the groove depth becoming deeper as the wall thickness increases. In this configuration, the size of the groove is matched to the wall thickness. With a greater wall thickness, the local distribution of stresses in the joining region makes it necessary for the groove to be designed to be deeper, in order to produce a sufficient shift in the forces which are active in the joining region toward angles of greater than 70 degrees. In this case, the groove depth should vary continuously with the wall thickness.

If the groove is oval or semicircular in cross section, it expediently forms an annular groove together with an opposite groove which is likewise semicircular. The diameter of this annular groove varies according to the wall thickness in the joining region. The diameter increases as the wall thicknesses become greater.

The first or second component piece may form the suction side, and in this case the second or first component piece, respectively, then forms the pressure side.

The blade or vane is designed in particular for a final stage of a gas turbine, as a gas turbine rotor blade. There are particularly high demands on the ability of a gas turbine blade or vane to withstand high temperatures. The gas turbine blade or vane in this case particularly preferably is more than 60 cm long. Such large blades or vanes lead to very high centrifugal force loads. A weight saving is particularly advantageous especially in such applications, and it is therefore especially advantageous to use a titanium alloy for the base body. Once again, however, the particularly high mechanical loads mean that a conventional bonding process is not sufficient to reliably join component pieces to one another. Only by forming the groove running in the joining region does it become possible to produce the joint with sufficient reliability.

With regard to the method, the object is achieved, according to the invention, by the features of the claims. In this method, a first shell-like component piece and a second shell-like component piece of a blade or vane profile made from a titanium alloy which comprises a first shell-like component piece, with the component pieces in each case being delimited by contact surfaces, which are bonded to one another by a high-pressure and high-temperature joint so as to form a joining region, so that a cavity is formed between the component pieces, this cavity being surrounded by the inner sides of the component pieces, wherein prior to the bonding a groove, which runs in the longitudinal direction of the blade or vane and the groove wall of which forms a joining angle of greater than 70 degrees with the contact surface, is introduced in at least one component piece in the joining region between the inner side of the component piece and the contact surface.

BRIEF DESCRIPTION OF THE DRAWINGS

Exemplary embodiments of the invention are explained in more detail below with reference to the drawings, in which, in some cases diagrammatically and not to scale.

Parts which correspond to one another are provided with the same reference symbols throughout all the figures.

DETAILED DESCRIPTION OF INVENTION

Figure 1:
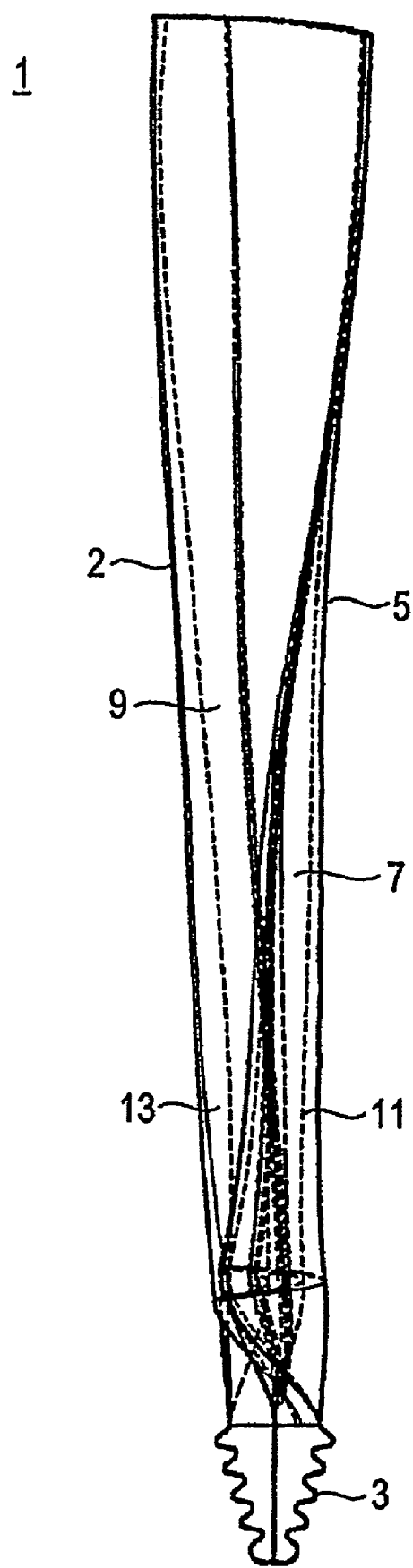
FIG. 1 shows a side view of a gas turbine rotor blade.

FIG. 1 shows a view of a gas turbine rotor blade 1 which is composed of a base body 2 made from a titanium aluminide alloy. Depending on the particular application, it is also possible for a protective layer, in particular a corrosion-resistant layer, to be applied to the base body 2. The gas turbine rotor blade 1 has a blade root 3 in fir-tree form, in order to engage, in a manner which is not illustrated in more detail, in a corresponding groove in a rotor disk. The blade root 3 is adjoined by a main blade section 5, which has a suction side 7 and a pressure side 9.

The gas turbine rotor blade 1 is formed from a first component piece 11 and a second component piece 13. The first component piece 11 forms the suction side 7. The second component piece 13 forms the pressure side 9. The two shell-like component pieces 11, 13, which are usually formed from sheet metal, are joined to one another by a high-pressure and high-temperature bonding process.

Figure 2:
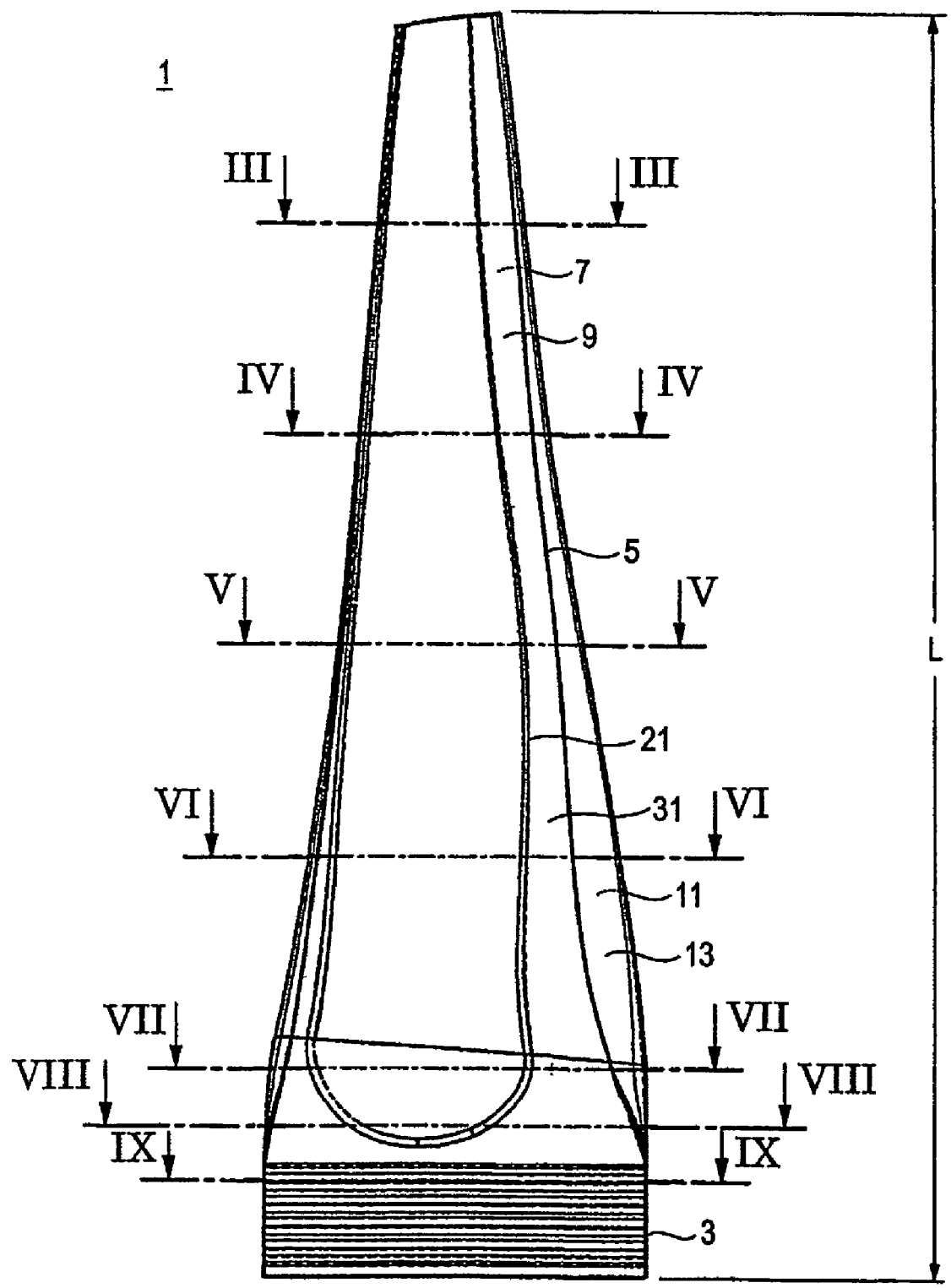
FIG. 2 shows a different side view of the gas turbine rotor blade shown in FIG. 1, FIGS. 3-9 show sectional illustrations on lines III-III, IV-IV, V-V, VI-VI, VII-VII, VIII-VIII and IX-IX, respectively, in FIG. 2.
Figure 3:
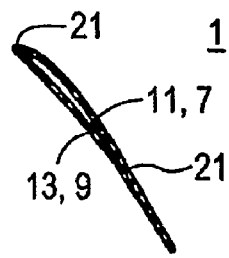
Figure 4:
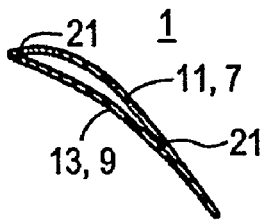
Figure 5:
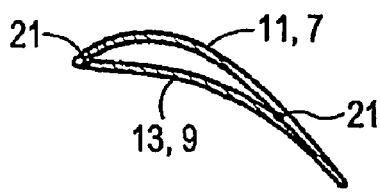
Figure 6:
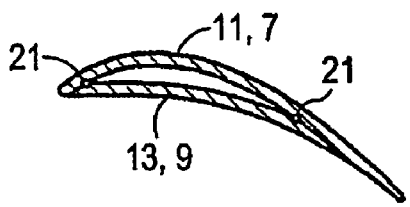
Figure 7:
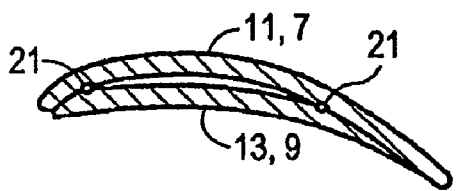
Figure 8:
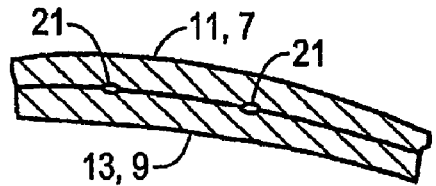
Figure 9:
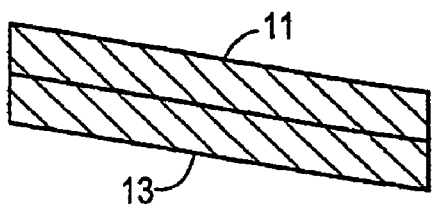

FIG. 2 shows a further view of the gas turbine rotor blade 1. In a joining region 31 (cf. also FIG. 10), the component pieces 11, 13 are joined to one another by the bonding process. An annular groove 21, which prevents the joint from tearing open, is present in the joining region 31.

FIGS. 3 to 9 show the cross sections indicated in FIG. 2. It can be seen that the wall thickness of the gas turbine rotor blade 1 increases toward the blade root. The diameter of the annular groove 21 also increases in a corresponding way. The component pieces 11 and 13 enclose a cavity 10 which can allow internal cooling by means of a cooling fluid. Furthermore, the gas turbine rotor blade 1 is relatively lightweight, on account of the hollow design and the use of the titanium alloy for the base body 2. Accordingly, it can also be of large design. The blade length L is, for example, 940 cm.

As can be seen from FIGS. 3 to 9, the component pieces 11 and 13 adjoin one another at an acute angle. With a conventional joint produced by means of a bonding process, under the extreme loads encountered when a gas turbine is in use, the joint could tear open, on account of a very high local concentration of stresses. This is prevented by the annular groove 21, which increases the size of the acute joining angle, as explained in more detail below.

Figure 12:
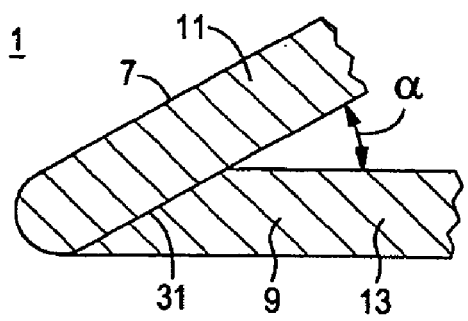
FIG. 12 shows, in an illustration corresponding to that presented in FIG. 10, a blade or vane of the prior art.

FIG. 12 shows a bonding joining region 31 at a blade leading edge according to the prior art. The inner sides of the component pieces 11 and 13 form a joining angle α in the joining region 31. The joining angle α is less than 70 degrees. The result is a very high local concentration of stresses on the inner side of the joining region 31, which can in turn cause the joint to tear open.

Figure 10:
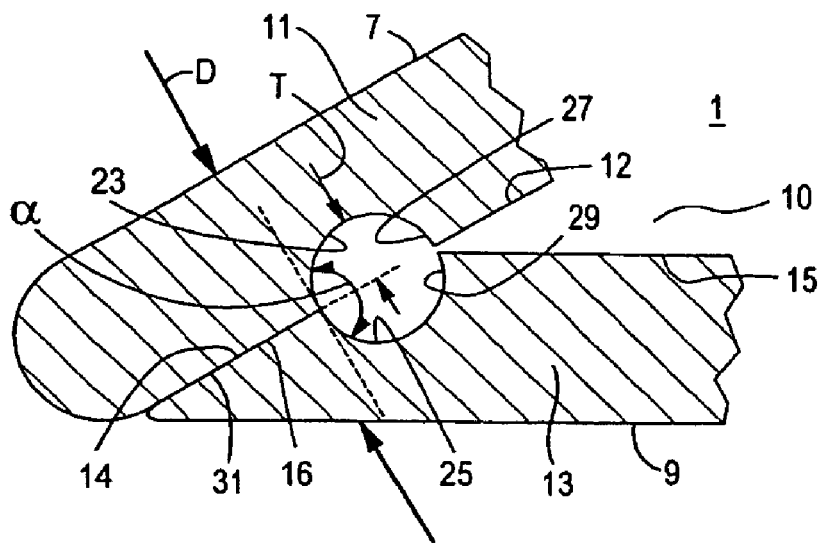
FIG. 10 shows an enlarged excerpt from the gas turbine rotor blade illustrated in FIG. 1.

FIG. 10 illustrates how the joint between the component pieces 11 and 13 is unproved by the annular groove 21. The annular groove 21 is formed by a groove 23 in the first component piece 11 and by an opposite groove 25, lying opposite the groove 23, in the second component piece 13. The groove 23 runs between the first contact surface 14 and the first inner side 12, and the opposite groove 25 runs between the second contact surface 16 and the second inner side 15. The groove 23—like the opposite groove 25—is semicircular, resulting in the circular or annular cross section of the annular groove 21. The groove 23 has a groove wall 27. The opposite groove 25 has an opposite-groove wall 29. The groove wall 27 ends flush with the opposite-groove wall 29. The joining angle α between the first component piece 11 and the second component piece 13 is increased in size to approximately 180 degrees by the groove wall 27 and the opposite-groove wall 29. As a result, the local concentration of stresses and the risk of the joint tearing open are greatly reduced. It is clearly apparent that the first inner side 12 and the second inner side 15 are not joined, i.e. bonded, to one another. A joining location there would cancel out the effect produced by the invention, namely the reduction in the concentration of stresses in the joining region. The groove 23 has a groove depth T. Measured perpendicular to the joining region 31 and in its center, the gas turbine blade 1 has a wall thickness D which is formed by the wall thicknesses of the first and second component pieces 11, 13. The groove depth T increases to the same degree as the wall thickness D along the joining region 31.

Figure 11:
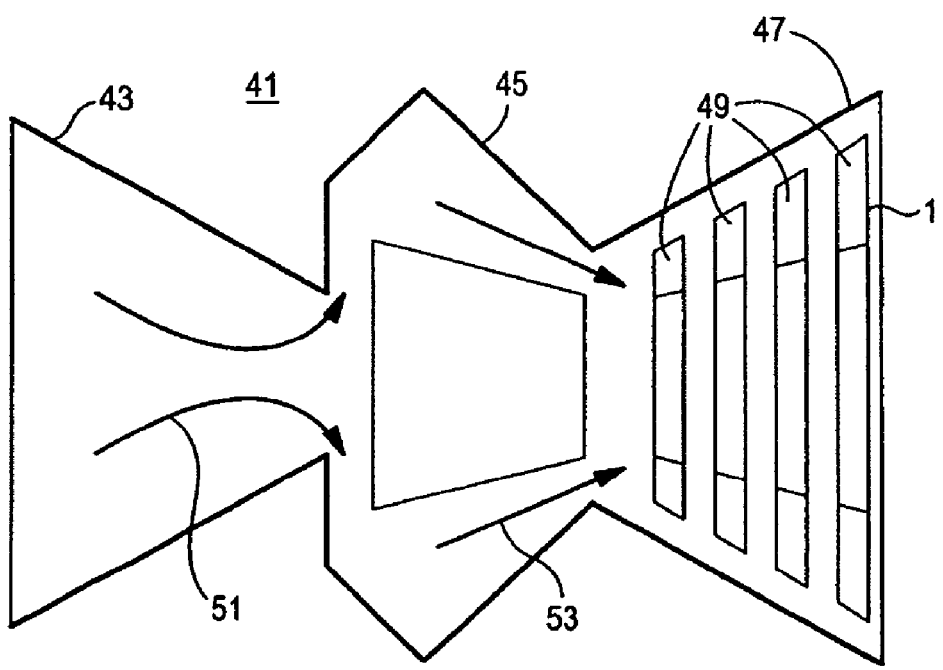
FIG. 11 shows a gas turbine.

FIG. 11 shows a gas turbine 41 with a compressor 43, a combustion chamber 45 and a turbine part 47. Air 51 is highly compressed by the compressor 43 and fed to the combustion chamber 45, where it is burnt with fuel to form a hot gas 53 which flows into the turbine part 47, where it flows past rings of blades 49, thereby driving the gas turbine 41. Large rotor blades 1 are arranged in particular in the final ring of blades 49 of the turbine part 47, since the flow passage of the turbine part 47 widens conically. These rotor blades 1 are exposed to particularly high centrifugal forces, and a reduction in weight resulting from the use of a titanium alloy is particularly advantageous here.

The invention claimed is:

1. A blade or vane of a turbomachine having a blade or vane profile made from a titanium alloy, comprising:
    a first shell-like titanium alloy component piece delimited by a first contact surface and a second shell-like titanium alloy component piece delimited by a second contact surface, the first piece bonded to the second piece by a high-pressure and high-temperature joint to form a joining region between the first and second component pieces;
    a groove that runs in a longitudinal direction of the blade or vane and is arranged at the joining region between a first inner side of the first component piece and the first contact surface, such that the groove on one side of the first component piece adjoins the first contact surface and on the other side of the first component piece adjoins the first inner side, and only the first contact surface is bonded to the second component piece; and
    a joining angle of greater than 70° formed between the groove and the first and second contact surfaces
    wherein the groove runs along the entire joining region,
    wherein the groove has a groove depth which varies along the groove direction
    wherein the first component piece and the second component piece, in the joining region, form a common wall thickness which varies along the joining region, the groove depth becoming deeper as the wall thickness increases.

2. The blade or vane as claimed in claim 1, wherein an opposite groove with an opposite groove wall, which lies longitudinally opposite the groove and runs in the longitudinal direction of the blade or vane, is arranged at the joining region between the second inner side of the second component piece and the second contact such that the opposite groove wall and the groove wall adjoin one another flush at the joining region and form a joining angle of more than 120°.

3. The blade or vane as claimed in claim 2, wherein the joining angle is more than 150°.

4. The blade or vane as claimed in claim 1, wherein the titanium alloy is titanium aluminide.

5. The blade or vane as claimed in claim 4, wherein the groove is oval or semicircular in cross section.

6. The blade or vane as claimed in claim 1, wherein the first component piece forms a suction side of the blade or vane and the second component piece, forms a pressure side of the blade or vane.

7. The blade or vane as claimed in claim 1, wherein the blade or vane is used in a final stage of a gas turbine.

8. The blade or vane as claimed in claim 1, wherein the blade or vane length is greater than 60 cm.

9. A process for producing a blade or vane of a turbomachine having a blade or vane profile made from a titanium alloy, comprising:
    forming a joining region from a first shell-like titanium alloy component piece and a second shell-like titanium alloy component piece, the component pieces each being delimited by contact surfaces are bonded to one another by a high-pressure and high-temperature joint;
    forming a cavity surrounded by an inner sides of the first component piece and an inner side of the second component piece and located between the component pieces;

arranging a groove running in the longitudinal direction of the blade or vane in the joining region between the first inner side of the first shell-like component piece and the contact surface of the first component piece; and bonding the groove such that on one side of the groove, the grove adjoins the first contact surface of the first component piece and on the other side of the groove, the grove adjoins the first inner side of the first component piece, and wherein only the first contact surface is bonded to the second component piece, and the groove wall has a joining angle of greater than 70° with the contact surface wherein the groove runs along the entire joining region, wherein the groove has a groove depth which varies along the groove direction wherein the first component piece and the second component piece, in the joining region, form a common wall thickness which varies along the joining region, the groove depth becoming deeper as the wall thickness increases.

10. A turbomachine blade made from a titanium alloy, comprising:

a first titanium based component piece having a first leading edge, a first trailing edge, a first inner surface, a first outer surface, a first leading edge contact face extending between the first inner and first outer surfaces towards the first leading edge, a first trailing edge contact face extending between the first inner and first outer surfaces towards the first trailing edge, a first leading edge arc defined by a first end point located along the first leading edge contact face and a second end point located along the first inner surface, and a first trailing edge arc defined by a first end point located along the first trailing edge contact face and a second endpoint located along the first inner surface;

a second titanium based component piece having a second leading edge, a second trailing edge, a second inner surface, a second outer surface, a second leading edge contact face extending between the second inner and second outer surfaces towards the second leading edge, a second trailing edge contact face extending between the second inner and second outer surfaces towards the second trailing edge, a second leading edge arc defined by a first end point located along the second leading contact face and a second end point located along the second inner surface, and a second trailing edge arc defined by a first end point located along the second trailing edge contact face and a second endpoint located along the second inner surface;

a leading edge bond adapted to adhere the first leading edge contact face with the second leading edge contact face such that the first leading edge arc and the second leading edge arc form a continuous arc; and a trailing edge bond adapted to adhere the first trailing edge contact face with the second trailing edge contact face such that the first trailing edge arc and the second trailing edge arc region further form the continuous arc, wherein the leading and trailing edge bonds are formed in a joining region, wherein the continuous arc runs along the entire joining region, wherein the continuous arc has an arc depth which varies along the continuous arc direction, wherein the first component piece and the second component piece, in the joining region, form a common wall thickness which varies along the joining region, the continuous arc depth becoming deeper as the wall thickness increases.

11. The blade as claimed in claim 10, wherein the first leading edge arc, the second leading edge arc, the first trailing edge arc, and the second trailing edge arc, each have a radius of curvature that is not constant.

12. The blade as claimed in claim 10, wherein the first leading edge arc, the second leading edge arc, the first trailing edge arc, and the second trailing edge arc, each have an arc that is concave.

13. The blade as claimed in claim 10, wherein the first leading edge arc, the second leading edge arc, the first trailing edge arc, and the second trailing edge arc, each have an arc that forms a semicircle.

14. The blade as claimed in claim 10, wherein the continuous arc formed by the first leading edge arc and the second leading edge arc, and the continuous arc formed by the first trailing edge arc and the second trailing edge arc, each have a plurality of radii of curvature.

15. The blade as claimed in claim 14, wherein the continuous arc formed by the first leading edge arc and the second leading edge arc, and the continuous arc formed by the first trailing edge arc and the second trailing edge arc, each have a radius of curvature that forms an ellipse.

16. The blade as claimed in claim 10, wherein a hollow region is formed between the first inner surface and the second inner surface.

17. The blade as claimed in claim 16, wherein the continuous arc formed by the first leading edge arc, the second leading edge arc, the first trailing edge arc, and the second trailing edge arc, each are located on a periphery of the hollow region.

18. The blade as claimed in claim 10, wherein the blade has a length greater than 60 centimeters.

19. The blade as claimed in claim 10, wherein a joining angle formed between the first leading edge arc and the second leading edge arc, and the joining angle formed between the first trailing edge arc and the second trailing edge arc, is greater than 70°.

20. The blade as claimed in claim 10, wherein the entire length of the first leading edge arc is arcuate, the entire length of the first trailing edge arc is arcuate, the entire length of the first trailing edge arc is arcuate, and the entire length of the first trailing edge arc is arcuate.

* * * * *